(12) United States Patent
Butler et al.

(10) Patent No.: US 7,292,503 B2
(45) Date of Patent: Nov. 6, 2007

(54) MULTI PISTON ELECTRO-MECHANICAL TRANSDUCTION APPARATUS

(75) Inventors: Alexander L. Butler, Weymouth, MA (US); John L. Butler, Cohasset, MA (US)

(73) Assignee: Image Acoustics, Inc., Cohasset, MA (US)

( * ) Notice: Subject to any disclaimer, the term of this patent is extended or adjusted under 35 U.S.C. 154(b) by 353 days.

(21) Appl. No.: 10/836,864

(22) Filed: May 3, 2004

(65) Prior Publication Data

US 2007/0230277 A1    Oct. 4, 2007

(51) Int. Cl.
*H04R 7/00*    (2006.01)

(52) U.S. Cl. ...................................................... 367/163

(58) Field of Classification Search ................ 367/153, 367/157, 162, 176, 158, 163, 165, 164; 310/334, 310/320, 323.01, 328, 369
See application file for complete search history.

(56) References Cited

U.S. PATENT DOCUMENTS

| | | | |
|---|---|---|---|
| 3,378,814 A | 4/1968 | Butler | |
| 3,845,333 A | 10/1974 | Holloway | |
| 3,924,259 A | 12/1975 | Butler et al. | |
| 4,326,275 A | 4/1982 | Butler | |
| 4,438,509 A | 3/1984 | Butler et al. | |
| 4,443,731 A | 4/1984 | Butler et al. | |
| 4,642,802 A | 2/1987 | Butler et al. | |
| 4,742,499 A | 5/1988 | Butler | |
| 4,754,441 A | 6/1988 | Butler | |
| 4,845,688 A | 7/1989 | Butler | |
| 4,864,548 A | 9/1989 | Butler | |
| 4,894,811 A * | 1/1990 | Porzio | 367/174 |
| 5,047,683 A | 9/1991 | Butler et al. | |
| 5,081,391 A | 1/1992 | Owen | |
| 5,184,332 A | 2/1993 | Butler | |
| 5,742,561 A | 4/1998 | Johnson | |
| 6,465,936 B1 | 10/2002 | Knowles et al. | |
| 6,643,222 B2 | 11/2003 | Osborn et al. | |
| 6,654,316 B1 | 11/2003 | Butler et al. | |
| 6,734,604 B2 * | 5/2004 | Butler et al. | 310/334 |
| 6,950,373 B2 * | 9/2005 | Butler et al. | 367/158 |

OTHER PUBLICATIONS

Multimode Directional telesonar Transducer Proc. IEEE Oceans, v2, 1289-1292 (2000).

* cited by examiner

*Primary Examiner*—Daniel Pihulic
(74) *Attorney, Agent, or Firm*—David M. Driscoll, Esq.

(57) ABSTRACT

An electro-mechanical transducer, which provides radial amplified multiple piston motion is formed from attached multiple lever arms and multiple electro-mechanical drivers. The piston motion is amplified by lever arms, which are attached to electro-mechanical drivers, such as piezoelectric or magnetostrictive drivers, which oscillate in a radial direction in unison with the applied voltage. A minimum of three pistons, three lever arms (or shells) and three drivers may be used. A preferred embodiment, uses four pistons, four lever arms (or shells) and four drivers. As a result of both the magnified motion of the lever arms (or shells) and the large acoustic radiating area of the multiple pistons, the transducer provides a means for a high-source level from a compact low-frequency broadband transducer.

19 Claims, 4 Drawing Sheets

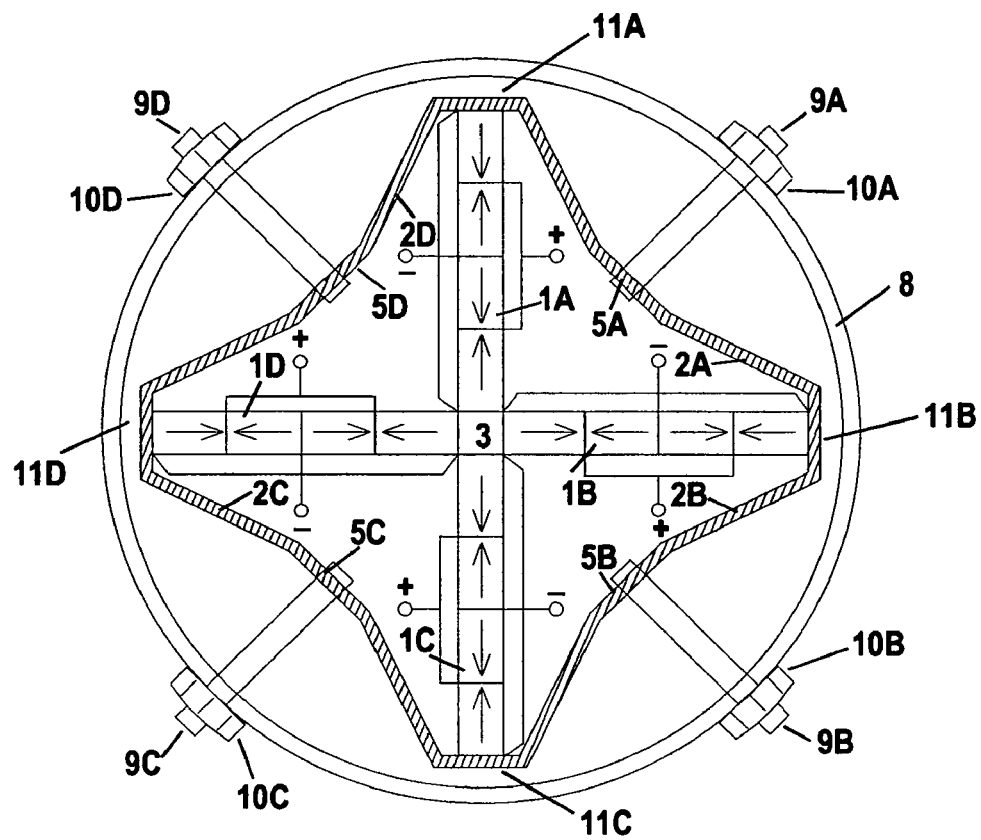
Fig. 4
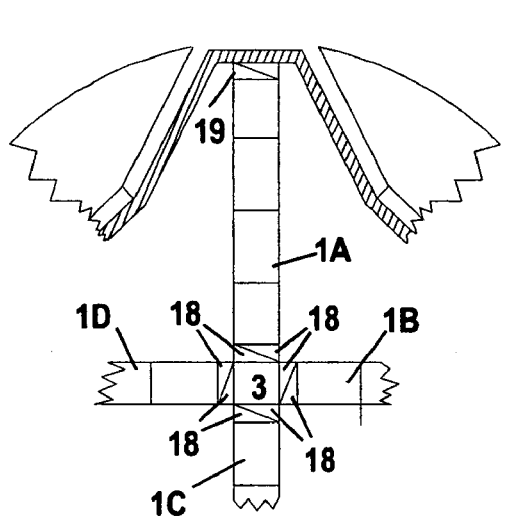 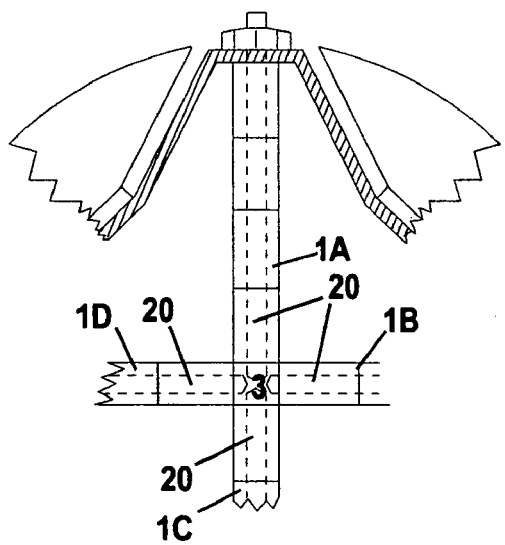
Fig. 4A  Fig. 4B

MULTI PISTON ELECTRO-MECHANICAL TRANSDUCTION APPARATUS

This invention was made with U.S. Government support under Contract No. N66604-99-C-2807 awarded by NAVSEA and SPAWAR. The Government may have certain rights.

BACKGROUND OF THE INVENTION

1. Field of the Invention

The present invention relates in general to transducers, and more particularly to acoustic transducers. The present invention also relates to a compact transducer capable of radiating acoustic energy from large magnified piston displacements through a radial drive arrangement.

2. Background and Discussion

An orthogonal drive electro-mechanical apparatus is shown in my earlier granted U.S. Pat. Nos. 4,845,688, and 6,654,316 B1. This transducer construction uses lever arms or shells, which are connected to active piezoelectric, electrostrictive or magnetostrictive elements to drive one or more pistons with amplified motion. Another orthogonal electro-mechanical apparatus is shown in another of my earlier granted patents, namely, U.S. Pat. No. 4,754,441 where a bending motion of the drive system is used to move a flextensional shell in a mode of oscillation. Still another one of my earlier patents is U.S. Pat. No. 4,742,499, which shows four orthogonal electro-mechanical bars driving four curved plates to produce a radial amplified motion of the plates thus providing acoustic radiation into the medium in contact with the plates (or shells).

It is a general object of the present invention to provide a transduction apparatus, which is of the general type described in my prior art patent, U.S. Pat. No. 4,742,499 but which is of improved construction and performance using a radial piston arrangement for the acoustic radiation. The motion of the piston arrangement of the present invention is not orthogonal to the motion of the drivers as in the prior art U.S. Pat. Nos. 4,845,688 and 4,754,441.

Another object of the present invention is to provide a magnified-motion multiple-piston transduction apparatus driven by radial extensional electro mechanical means.

A further object of the present invention is to provide an improved acoustical matching means for broadband operation at low frequencies through the magnified motion of the multiple piston transduction apparatus.

A still further object of the present invention is to provide a bender mode driven electro mechanical means for exciting other modes such as the dipole mode or quadrupole mode.

Still another object of the present invention is to provide a three dimensional arrangement for exciting the fundamental mode and three orthogonal dipole modes in the form of a tri-axial projector or receiver.

All of the above mentioned patents are hereby incorporated by reference in their entirety.

SUMMARY OF THE INVENTION

To accomplish the foregoing and other objects, features and advantages of the invention there is provided an improved electro-mechanical transduction apparatus that employs means for utilizing electro-mechanical drivers in a way that not only moves lever arms but also moves pistons with magnified motion in a radial direction. These pistons move with a displacement equal to the maximum displacement of the lever arms or shells and yield a greater source strength (or volume velocity) than the lever arms alone. The pistons and the electro-mechanical drivers move in a radial direction and are not necessarily collinear.

In accordance with the invention there is provided an electro-mechanical transduction apparatus that is comprised of at least three shells or lever arms with at least three attached pistons at the location of maximum displacement of the lever arms and driven by at least three electro-mechanical drivers at the intersection of the shells or lever arms. The shells are driven by a corresponding number of attached piezoelectric or magnetostrictive rods or bar drivers which together take on the form of a regular polygon. The shaped shells are attached to the ends of the drivers and vibrate with a magnified motion as the drive bars or rods execute extensional motion. Pistons are attached to the midpoint of the shells or lever arms and move with the maximum motion of the magnified shell or lever arm motion producing a source strength or volume velocity greater than the shells alone and produce this at a lower resonant frequency than without the pistons. As the polygon expands, the extensional motion of the electro-mechanical drivers is added to the magnified piston motion providing additional source strength. The magnification through the lever arms may be improved by a hinge type construction at locations near the electro-mechanical driver and the piston. The pistons move inward and outward in unison with the applied voltage to the drivers.

In one preferred cylindrical embodiment of the invention four piezoelectric bars are used to drive four lever arms which, in turn, drive four pistons radiating into the medium producing an improved source strength. The lever arms magnify the motion of the drive stacks, typically of piezoelectric material creating a large magnified velocity at a lever point of maximum motion where the pistons are attached. The pistons translate this maximum velocity uniformly over a larger area than the smaller area of maximum motion of the shells. These two factors, the creation of a large velocity due to magnified motion and the creation of a large radiating area moving with this magnified motion, produce a large source strength, given by the product of the velocity and area of the face of the pistons.

In another preferred spherical embodiment of the invention six piezoelectric bars are used to drive eight shells or eight tri-lever arms which, in turn, drive eight pistons radiating into the medium producing a large source strength. The lever arms magnify the motion of the drive stacks, typically of piezoelectric material, creating a magnified velocity at a lever point of maximum motion where the pistons are attached. The pistons translate this maximum velocity uniformly over a larger area than the smaller area of maximum motion of the shells producing a large source strength.

In accordance with the invention there is also provided an electro-mechanical apparatus that comprises:

a plurality of radially arranged piezoelectric or magnetostrictive drivers;

a plurality of intermediate responsive members that are arranged in the form of a polygon and that each extend between adjacent drivers;

a plurality of pistons attached to said intermediate responsive members at a location between ends of respective intermediate responsive members;

said intermediate responsive members being attached to the ends of said drivers so as to vibrate with a magnified motion as the drivers are driven so as to execute extensional motion.

Further features include:
(a) the intermediate responsive members are either shells or lever arms;
(b) the drivers extend from a center post;
(c) a cylindrical version uses four drivers, four intermediate members and four pistons;
(d) a three dimensional version uses six drivers, eight intermediate members and eight pistons;
(e) each of the intermediate members may comprise a concave shell member;
(f) each of the pistons is attached to the intermediate responsive member at a midpoint thereof;
(g) the pistons are attached to the shells or lever arms and move with maximum motion producing acoustic radiation with volume velocity or source strength that is greater than the shell alone, and produces this output at a lower resonant frequency than without the use of pistons;
(h) the piston motion is substantially in a direction that is 180°/N (45 degrees in FIG. 1) to the driver motion direction;

Although the embodiments illustrate means for acoustic radiation from a piston, alternatively, a mechanical load can replace the pistons and in this case the transducer would be an actuator. Also, as a reciprocal device the transducer may be used as a receiver as well as a transmitter and may be used in a fluid, such as water, or in a gas, such as air.

BRIEF DESCRIPTION OF THE DRAWINGS

Numerous other objectives, features and advantages of the invention should now become apparent upon a reading of the following detailed description taken in conjunction with the accompanying drawings, in which:

FIG. 4 is an alternative embodiment depicted in a schematic cross-sectional view and illustrating a means for applying a compression to the electromechanical drivers by means of an outside stiff ring and four screws;

FIG. 4A illustrates a means for applying a pre-compression to the electromechanical drivers by means of stiff wedges.

FIG. 4B illustrates a means for applying a pre-compression to the electromechanical drivers by means of high strength bolts.

DETAIL DESCRIPTION

In accordance with the present invention, there is now described herein a number of different embodiments for practicing the present invention. There is provided a transducer for obtaining a large source strength by means of multiple pistons and mechanical lever arms that may be energized by electromechanically active material, such as by, piezoelectric, electrostrictive or magnetostrictive members, the combination of which can be constructed in a relatively compact size. The lever arms or shells (which may also be referred to as intermediate responsive members) amplify the motion of the active material producing a large displacement at the piston for electro-acoustic transduction or actuation. The magnification of the piston or load motion is achieved through the inverse slope of the lever arms relative to the chord between the ends of the lever arms, as attached to the electromechanical drive means. Additional additive motion is achieved by the in-phase motion of the electromechanical driver. The maximum motion from the lever arms and the additive motion of the drivers yield a large sound radiating piston moving uniformly with maximum motion.

Figure 1:
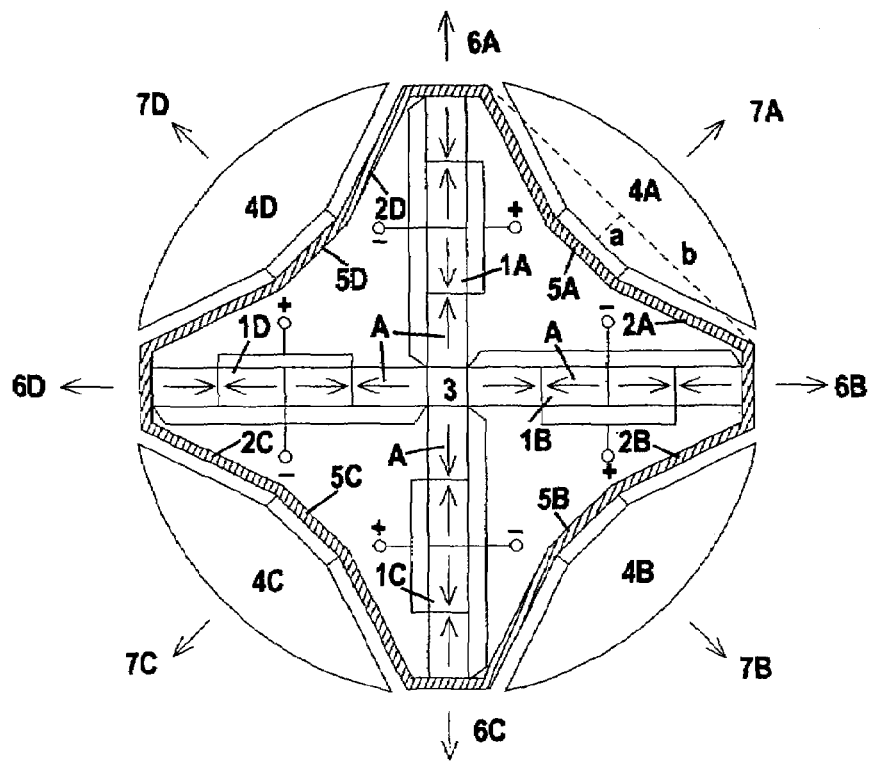
FIG. 1 is a schematic cross-sectional view of a cylindrical embodiment showing the principles of the present invention applied to a four sided astroid-shaped transducer with pistons attached to the point of maximum motion of the four shells, and driven by four electromechanical drivers.

An example of a four sided astroid-shell shaped device is shown, in cross-section, in FIG. 1 illustrating four crossed piezoelectric driver bars 1A-1D driving four lever-arm shells 2A-2D from the center post 3 with four pistons 4A-4D in contact at areas 5A-5D of the respective shells 2A-2D. The drivers 1A-1D may be constructed from piezoelectric ceramic such as PZT and operated in the 33 or 31 mode, but other driver materials such as single crystal, electrostrictive or magnetostrictive may be used. In FIG. 1 the piezoelectric ceramic PZT material is shown as parallel wired and operated in the 33 mode with arrows A showing the direction of polarization.

The lever-arm shells 2A-2D may be constructed from steel or titanium, or other high strength metals or composites. The pistons 4A-4D may be constructed from aluminum or steel, or other metals or composites. Although the pistons show an outer curved shape so as to conform with a cylindrical geometry, they may take on other shapes for enhanced radiation or stability. The center post 3 should be fabricated from a stiff material such as steel or tungsten. The entire cylindrical construction may be enclosed with end caps (not shown) attached to the center post 3 and the exterior of the transducer may be potted in polyurethane or booted with rubber to prevent water ingression. All essential parts of the transducer may be cemented, screwed, or welded together and the driver should be cemented under compression. The axial length of the transducer may be adjusted to inhibit unwanted modes and the total overall length of the cylinder may be made from a number of individual transducers.

In the embodiment of FIG. 1, as the four drivers 1A-1D expand outward in respective directions 6A-6D, the lever arms 2A-2D move outward with magnified motion in the respective radial directions 7A-7D, thus moving the pistons 4A-4D along the respective directions 7A-7B. The pistons 4A-4D move inward as the voltage polarity is reversed. The resonant frequency is controlled by the diameter, the mass of the pistons, the structure of the driver and the shells, the design of the junction at the piston and drivers and the magnification factor of the levers arms. With "b" the half length of the chord between the drivers and "a" the distance between the center of the chord and the point of contact at the pistons (see FIG. 1), the ideal amplification, M, of the motion of the pistons, relative to the extensional motion of the drivers, may be shown to be approximately given by $M=(1+b/a)/\sqrt{2}$. Thus, for $b/a=3$ the magnification would be approximately 2.8, assuming stiff lever arms. In addition to magnifying the motion of the piston, this magnification factor, coupled with the large area of the piston, provides a better match to the electro-mechanical drivers and increases the effective transferred radiation load, by the factor $M^2$, onto the drivers, providing broadband transducer response.

Figures 2, 3:
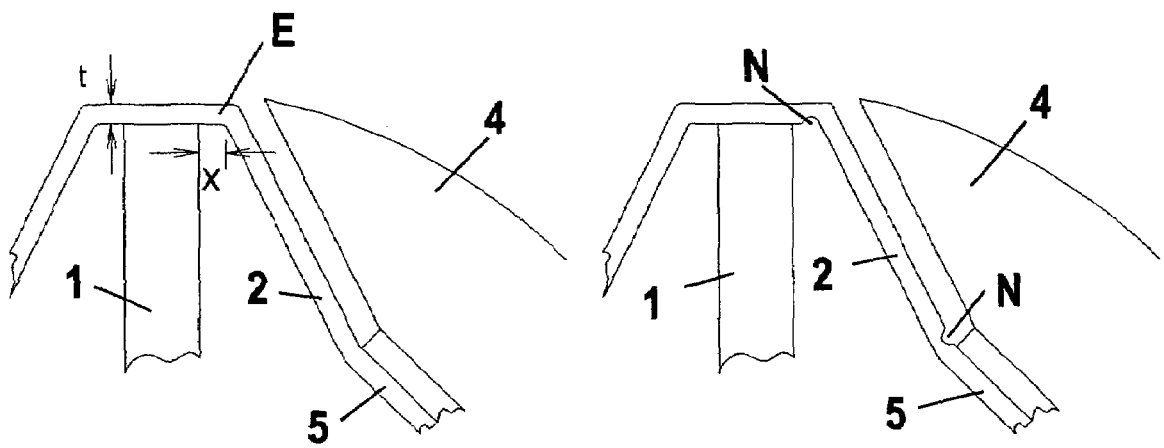
FIG. 2 shows a hinged arm extension arrangement at the end of an electromechanical driver lever arm and piston.
FIG. 3 shows a hinge arrangement where notches are used to provide an improved hinge action at the ends of the lever bar.

To achieve this ideal magnification the lever arms should be stiff with bending motion or a hinge type motion at the intersection of the drivers and arms or shells. FIGS. 2 and 3 illustrate arrangements of the lever arms 2 with hinged type motion. FIG. 2 shows an overhang extension E disposed a distance x that can be more effective by making the thickness t of the arm smaller than the thickness of the remaining lever arm. FIG. 3 illustrates the use of curved notches N to achieve hinged actions near the piston 4 and the drive 1.

A pre-compression on the drivers may be achieved by the fabrication technique illustrated in FIG. 4. The alternate embodiment of FIG. 4 shows the four crossed piezoelectric driver bars 1A-1D driving four lever-arm shells 2A-2D from the center post 3. In the embodiment of FIG. 4 there is provided a stiff steel ring 8 that surrounds the transducer and is connected to the transducer through the four threaded rods 9A-9D screwed into the respective shell 2A-2D at 5A-5D. In practice the drive stacks are made slightly oversized and are fit into the shell by expanding the shell using the four nuts 10A-10D. The drivers and inner parts of the shell are wiped with epoxy before insertion of the drivers into the shell. The over-sizing is calculated to apply the desired compression of the drivers when the nuts are backed off. The piston can be attached (such as to the bolts 10) after this process or the process can be performed with the pistons in place. Moreover, the four screws or bolts can alternatively be attached to the ends of the shell directly opposite the stack ends at 11A-11D instead of at 5A-5D as in FIG. 4. Also, metal wedges applied near the center post or at the outer ends of the driver stacks may be used, as an alternative means, to apply a pre-compression to the driver stacks. As shown in FIG. 4A, metal wedges 18 may be applied near the center post or at the ends, as shown by the wedge 19 in FIG. 4A. These wedges of the driver stacks may be used, as an alternative means, to apply a pre-compression on the driver stacks. Alternatively, high strength bolts may be used to compress the drivers. As shown in FIG. 4B, high strength bolts 20 that are shown extending through the driver may be used to compress the drivers.

Figure 5:
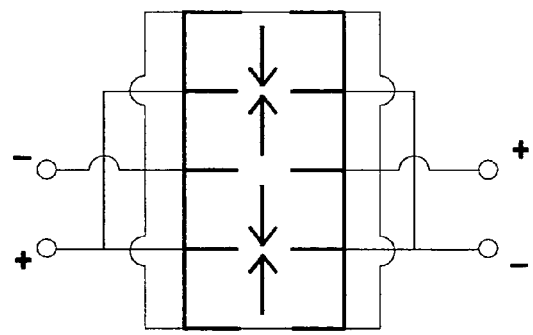
FIG. 5 shows an alternative drive configuration where the piezoelectric drive bars are wired separately on both sides allowing them to be driven into a bender mode exciting the transducer into a dipole or quadrupole mode.
Figure 5A:
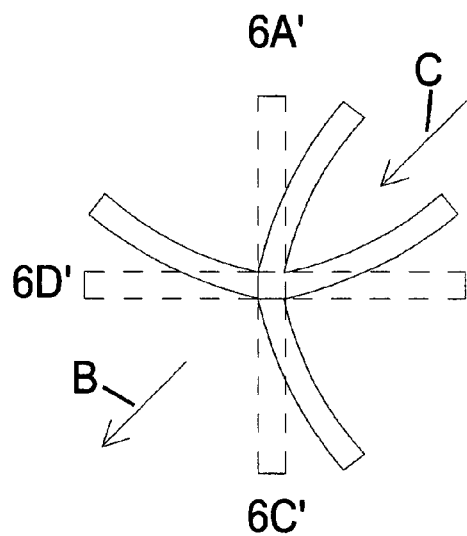
FIG. 5A schematically illustrates the transducer drivers operated in the dipole mode with bending motion.
Figure 5B:
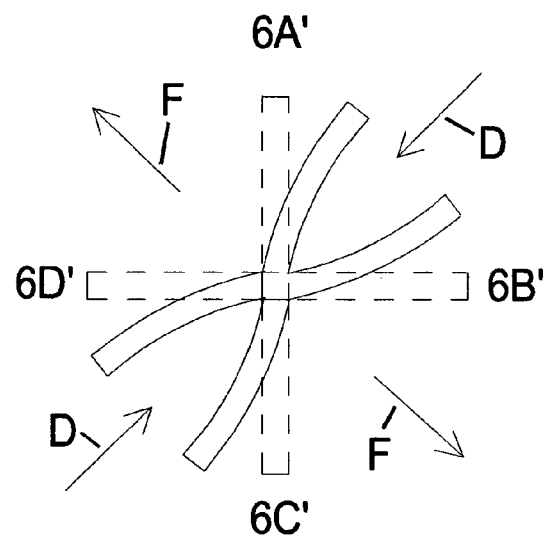
FIG. 5B schematically illustrates the transducer drivers operated in the quadrupole mode of vibration with bending motion.

The transducer of FIG. 1 may be operated in a dipole mode by separating the electrodes as shown in FIG. 5 and driving the sides with opposite phased voltages, also shown in FIG. 5. With this wiring the driver bars do not execute extensional motion and instead execute bending motion. The (exaggerated) bending motion illustrated in FIG. 5A can be obtained with drivers 1A and 1C wired as indicated in FIG. 5 and drivers 1B and 1D with the + and − signs reversed in FIG. 5. This results in piston 4C of FIG. 1 moving outward (arrow B) causing an increase in the medium pressure and piston 4A of FIG. 1 moving inward (arrow C) causing a decrease in the medium pressure, thus creating a dipole with the usual figure eight beam pattern. Pistons 4B and 4D slide along in the opposite direction and produce little radiation. This mode may be combined with the fundamental extensional mode of FIG. 1, with appropriate amplitude and phase compensation, to create a cardioid beam pattern. The arrangement of FIG. 5 may be used to excite a quadrupole mode of vibration by reversing the polarities of bars 1C and 1D causing the bar bending motion illustrated in FIG. 5B with corresponding piston motions indicated by the arrows D and F.

Figure 6A:
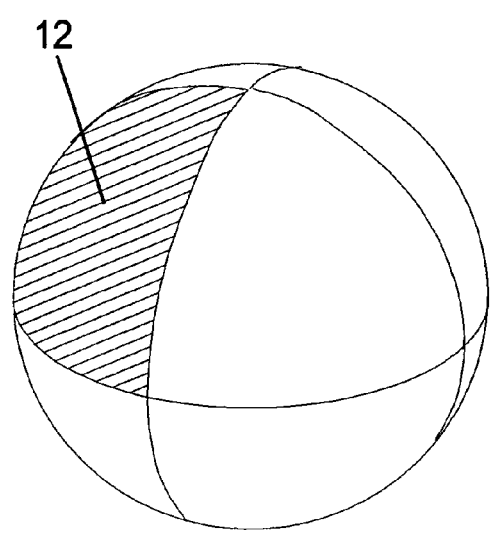
FIG. 6A shows a three dimensional version of the present invention using eight pistons.

The invention is not limited to a cylindrical or circular structure and can be extended to a 3 dimensional spherical-like structure as illustrated in FIG. 6A showing eight outwardly curved pistons in the eight octants of the sphere, one of which is illustrated as 12. The pistons of FIG. 6A are attached to the center points of the curved spherical triangular shells 13 of FIG. 6B or the triple lever arms 14 of FIG. 6C. The six drivers 15A-15F of FIG. 6D are in contact with the eight shells, or triple lever arms, at the six intersections of the eight shells or lever arms. FIG. 6B illustrates four of the eight inwardly curved or stepped shells 13, each one of which supports a piston at its center. Each of these shells may be replaced by eight three-intersecting lever arms of FIG. 6C which support the pistons at their intersection. The six driver bars are illustrated in FIG. 6D with outer ends that are securely fastened to the shells at 16A-16F of FIG. 6B or fastened to the lever arms of FIG. 6C at 17A-17F.

Figure 6C:
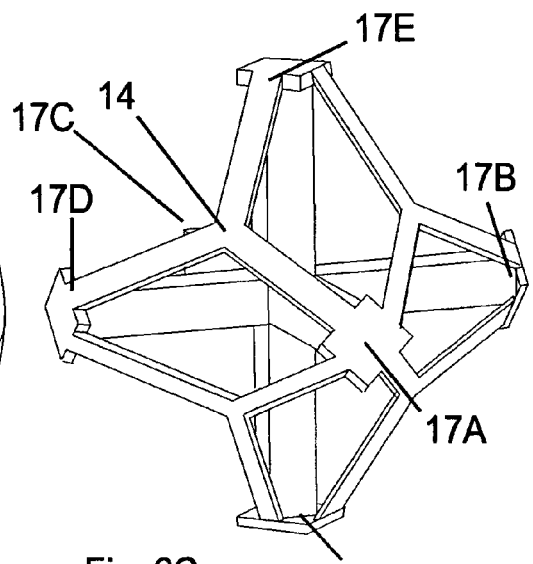
FIG. 6C shows an alternative three dimensional version of the present invention, without pistons, showing three lever arms replacing a single shell.
Figure 6B:
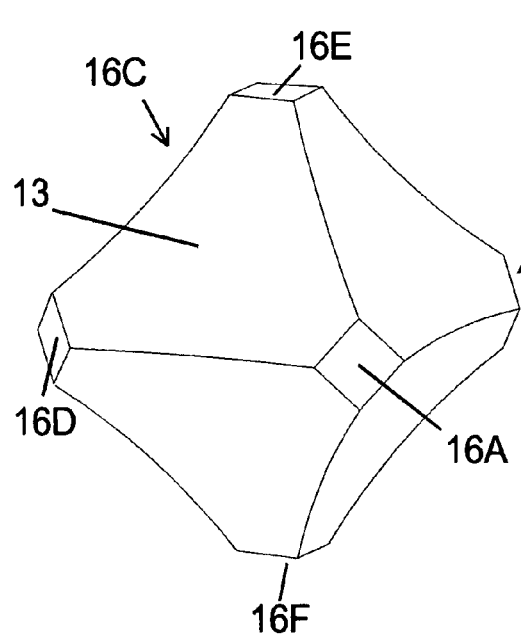
FIG. 6B shows a three dimensional version of the present invention, without pistons, showing four of the eight shells.
Figure 6D:
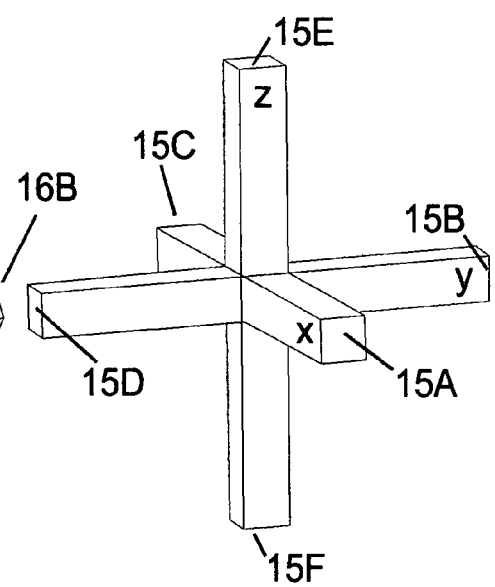
FIG. 6D shows a three dimensional version of the present invention, without pistons and shells, and showing six electromechanical drivers.

In the three-dimensional, omni-directional, compression-mode embodiment the six drivers expand along their length causing the eight shells 13 of FIG. 6B or eight triple-lever arms 14 of FIG. 6C to move outward with maximum amplified motion at the center of the shells or triple-lever arms which are connected to the eight pistons of FIG. 6A. The pistons move inward on the next half cycle and radiate into the medium in unison with an applied sinusoidal voltage. This transducer may also be driven into a dipole mode in the x, y and z direction by separating the electrodes and reversing the phase as illustrated in FIG. 5. For example excitation of a dipole oriented along the z direction can be accomplished by exciting the four bars of the x-y plane with ends 15A-15D, of FIG. 6D, to bend in the −z direction while simultaneously extending the remaining upper bar with end 15E in the +z direction and contracting the lower bar with end 15F in the −z direction. While the versions of FIG. 6C with triple intersecting lever arm bars requires the eight pistons for acoustic radiation, the version with shells of FIG. 6B may be used without pistons with acoustic radiation occurring from the shells. Use of pistons provides a greater source strength and lower resonance frequency. Although the shells of FIG. 6B would normally not be in physical mechanical contact at their edges, this is an alternative construction for higher frequency operation.

Finite element models have been constructed to verify the performance of the device illustrated in FIG. 1. A design 18 inches in diameter and 12 inches long driven with PZT stacks produced an in-water resonant frequency of approximately 400 Hz, a mechanical Q of 4 and a smooth omni-directional transmitting response from 300 Hz to 500 Hz with a power output capability of approximately 2,000 watts. A three dimensional finite element 4.5 inch model has also been designed for operation in the omni and dipole mode with both resonant frequencies in the vicinity of 7,000 Hz.

Having now described a limited number of embodiments of the present invention, it should now become apparent to those skilled in the art that numerous other embodiments and modifications thereof are contemplated as falling within the scope of the present invention as defined in the appended claims.

What is claimed is:

1. An electro-mechanical transduction apparatus that is comprised of at least three shells or lever arms with at least three attached pistons at the location of maximum displacement of the three shells or lever arms and driven by at least three electro-mechanical drivers at the intersection of the shells or lever arms, said shells or lever arms being driven by a corresponding number of attached piezoelectric or magnetostrictive rods or bar drivers which together take on the form of a regular polygon, said shells or lever arms being attached to the ends of the drivers and vibrate with a magnified motion as the drivers execute extensional motion, said pistons being attached to the shells or lever arms so as to move with the maximum motion of the magnified shell motion producing acoustic radiation with improved volume velocity and source strength and at a lower resonant frequency.

2. An electro-mechanical transduction apparatus as set forth in claim 1 wherein the magnification through the lever arms may be improved by hinge type construction at locations near the electro-mechanical driver and the piston.

3. An electro-mechanical transduction apparatus as set forth in claim 1 wherein the transduction apparatus is piezoelectric, electrostrictive, single crystal, magnetostrictive or other electro-mechanical drive material or transduction system operated in the 31 or 33 modes and in the form of bars, rods, cylinders or rings.

4. An electro-mechanical transduction apparatus as set forth in claim 1 wherein the transduction apparatus is in the form of a bender bar operated in the 31 or 33 mode wired to excite the transducer into a dipole mode.

5. An electro-mechanical transduction apparatus as set forth in claim 1 wherein the transduction apparatus is in the form of a bender bar operated iii the 31 or 33 mode wired to excite the transducer into a quadrupole mode.

6. An electro-mechanical transduction apparatus as set forth in claim 1 wherein four pistons, four lever-arms and four drivers are used.

7. An electro-mechanical transduction apparatus as set forth in claim 1 wherein the pistons are curved to conform to a circle, or flat to conform to a chord of a circle.

8. An electro-mechanical transduction apparatus as set forth in claim 1 wherein pre-compression on the electromechanical drivers is obtained by extending the shell or lever arm from the drivers by means of an outer rigid ring with multiple threaded rods and nuts.

9. An electro-mechanical transduction apparatus as set forth in claim 1 wherein pre-compression on the electromechanical drivers is obtained by stiff wedges inserted between a center post and driver or between the shell and driver.

10. An electro-mechanical transduction apparatus as set forth in claim 1 wherein pre-compression on the electromechanical drivers is obtained by use of high strength bolts along the extensional length of the drivers.

11. An electro-mechanical transduction apparatus that is comprised of eight concave shells or lever arms and driven by six orthogonal electro-mechanical drivers at the intersection of the eight shells or lever arms, said concave shells or lever arms being attached to the ends of the drivers and vibrate with a magnified motion as the electromechanical drivers execute extensional motion.

12. An electro-mechanical transduction apparatus as set forth in claim 11 wherein the transduction apparatus is piezoelectric, electrostrictive, single crystal, magnetostrictive or other electro-mechanical drive material or transduction system operated in the 31 or 33 modes and in the form of bars, rods cylinders or rings.

13. An electro-mechanical transduction apparatus as set forth in claim 11 wherein the transduction apparatus is in the form of bender bars operated in the 31 or 33 mode wired to excite the transducer into a dipole mode.

14. An electro-mechanical transduction apparatus that is comprised of eight shells or lever arms with eight attached pistons at the location of maximum displacement of the lever arms and driven by six orthogonal electro-mechanical drivers at the intersection of the shells or lever arms, said shells or lever arms being attached to the ends of the drivers so as to vibrate with a magnified motion as the drivers execute extensional motion, said pistons being attached to the shells or lever arms so as to move with the maximum motion of the magnified shell motion producing acoustic radiation with volume velocity or source strength greater than the shells alone and produce this at a lower resonant frequency than without the pistons.

15. An electro-mechanical transduction apparatus as set forth in claim 14 wherein each shell is in the form of a concave spherical triangle.

16. An electro-mechanical transduction apparatus as set forth in claim 14 wherein each shell is in the form of three equal length lever arms intersecting at the central point of the shell.

17. An electro-mechanical transduction apparatus as set forth in claim 14 wherein the transduction apparatus is piezoelectric, electrostrictive, single crystal, magnetostrictive or other electro-mechanical drive material or transduction system operated in the 31 or 33 modes and in the form of bars, rods cylinders or rings.

18. An electro-mechanical transduction apparatus as set forth in claim 14 wherein the transduction apparatus is in the form of bender bars operated in the 31 or 33 mode wired to excite the transducer into a dipole mode.

19. An electro-mechanical transduction apparatus that is comprised of at least three shells or lever arms with at least three attached pistons at the location of maximum displacement of the three shells or lever arms and driven by at least three electro-mechanical drivers at the intersection of the shells or lever arms, said shells or lever arms being driven by a corresponding number of attached piezoelectric or magnetostrictive rods or bar drivers which together take on the form of a regular polygon, said shells or lever arms being attached to the ends of the drivers so as to vibrate with a magnified motion as the drivers execute extensional motion and with "b" the half length of the chord between the drivers and "a" the distance between the center of the chord and the point of contact at the pistons the ideal amplification, M, of the motion of the pistons relative to the extensional motion of the drivers is approximately given by $M=(1+b/a)/\sqrt{2}$.

* * * * *